US008416054B2

(12) United States Patent
Fitzgibbon

(10) Patent No.: US 8,416,054 B2
(45) Date of Patent: Apr. 9, 2013

(54) METHOD AND APPARATUS FOR TRAINING A LEARNING MOVABLE BARRIER OPERATOR TRANSCEIVER

(75) Inventor: James Joseph Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 486 days.

(21) Appl. No.: 12/712,798

(22) Filed: Feb. 25, 2010

(65) Prior Publication Data

US 2011/0205014 A1 Aug. 25, 2011

(51) Int. Cl.
*G05B 19/00* (2006.01)
*H04B 1/18* (2006.01)
*H04M 3/00* (2006.01)
*G09G 3/16* (2006.01)

(52) U.S. Cl. ........ 340/5.22; 340/5.1; 340/5.71; 340/5.8; 340/12.23; 340/539.19; 455/151.2; 455/418; 455/419; 455/420; 345/48

(58) Field of Classification Search ........................ None
See application file for complete search history.

(56) References Cited

U.S. PATENT DOCUMENTS

| | | | | |
|---|---|---|---|---|
| 4,535,333 | A * | 8/1985 | Twardowski | 340/5.25 |
| 5,751,224 | A | 5/1998 | Fitzgibbon | |
| 5,940,007 | A | 8/1999 | Brinkmeyer et al. | |
| 5,949,349 | A * | 9/1999 | Farris et al. | 340/5.26 |
| 6,025,785 | A * | 2/2000 | Farris et al. | 340/5.23 |
| 6,154,544 | A | 11/2000 | Farris et al. | |
| 6,377,173 | B1 | 4/2002 | Desai | |
| 6,810,123 | B2 | 10/2004 | Farris et al. | |
| 7,057,494 | B2 | 6/2006 | Fitzgibbon | |
| 7,071,850 | B1 | 7/2006 | Fitzgibbon et al. | |
| 7,412,056 | B2 | 8/2008 | Farris et al. | |

(Continued)

FOREIGN PATENT DOCUMENTS

| | | |
|---|---|---|
| DE | 196 07 017 A1 | 8/1997 |
| DE | 100 48 388 A1 | 4/2001 |

(Continued)

OTHER PUBLICATIONS

International and Search Report from PCT/US2011/024905 dated May 9, 2011 (15 pages).

(Continued)

*Primary Examiner* — Jennifer Mehmood
*Assistant Examiner* — Fekadeselassie Girma
(74) *Attorney, Agent, or Firm* — Fitch Even Tabin & Flannery LLP

(57) ABSTRACT

A system and method for training a learning transceiver to a movable barrier system includes a learning transceiver that is configured for being trained to the movable barrier system. To provide ease of use to consumers, a user is able to train the learning transceiver to the movable barrier system without needing to push a button on a movable barrier operator or use a pretrained transmitter. To this end, a movable barrier operator is configured to transmit a transmission signal to the learning transceiver including a rolling access code, which is used to train the learning transceiver. To maintain the security of the movable barrier system and to restrict unauthorized users from accessing the movable barrier system, the movable barrier operator waits to transmit the transmission signal, including the rolling access code, to the learning transceiver until it has received an indication that a predetermined event occurred.

43 Claims, 6 Drawing Sheets

U.S. PATENT DOCUMENTS

| | | | | |
|---|---|---|---|---|
| 7,477,147 | B2 | 1/2009 | Fitzgibbon | |
| 7,492,898 | B2 | 2/2009 | Farris et al. | |
| 7,561,075 | B2 | 7/2009 | Fitzgibbon et al. | |
| 8,194,856 | B2 * | 6/2012 | Farris et al. | 380/239 |
| 2002/0049904 | A1 | 4/2002 | Nowottnick et al. | |
| 2003/0033540 | A1 | 2/2003 | Fitzgibbon | |
| 2003/0210131 | A1 * | 11/2003 | Fitzgibbon et al. | 340/5.53 |
| 2005/0272372 | A1 * | 12/2005 | Rodriguez | 455/66.1 |
| 2006/0049914 | A1 * | 3/2006 | Fitzgibbon | 340/5.23 |
| 2007/0005806 | A1 | 1/2007 | Fitzgibbon et al. | |
| 2007/0058811 | A1 | 3/2007 | Fitzgibbon et al. | |
| 2007/0176735 | A1 * | 8/2007 | Blaker et al. | 340/5.22 |
| 2007/0294961 | A1 * | 12/2007 | Reed et al. | 52/111 |
| 2008/0297370 | A1 | 12/2008 | Farris et al. | |
| 2009/0016530 | A1 | 1/2009 | Farris et al. | |
| 2009/0021348 | A1 | 1/2009 | Farris et al. | |
| 2010/0007516 | A1 * | 1/2010 | Bos et al. | 340/825.69 |

FOREIGN PATENT DOCUMENTS

| | | | |
|---|---|---|---|
| DE | 101 00 576 | A1 | 3/2002 |
| EP | 0 870 889 | A2 | 10/1998 |
| WO | WO 2007/024283 | A1 | 3/2007 |

OTHER PUBLICATIONS

International Preliminary Report on Patentability and Writton Opinion from PCT/US2011/024905 Dated Sep. 7, 2012.

* cited by examiner

METHOD AND APPARATUS FOR TRAINING A LEARNING MOVABLE BARRIER OPERATOR TRANSCEIVER

TECHNICAL FIELD

This invention relates generally to transmitters for controlling movable barrier operators, and, more specifically, to methods and systems for training learning transceivers to operate with movable barrier systems.

BACKGROUND

Transmitters for remotely controlling the operation of movable barriers, for example garage doors, are often placed in the vehicle of the owner and actuated by the owner when the vehicle approaches the garage. For instance, the owner may press a button or buttons on the transmitter, and in response, the transmitter sends a signal to a receiver that is located in the garage and connected to the movable barrier operator. Upon receiving the signal, the receiver determines if the signal is authentic. For example, the receiver may determine if the signal includes a code that correlates with a code stored at the receiver. If a correlation is determined, an entry signal is applied to the movable barrier operator, and motors in the movable barrier operator cause the garage door to lift, allowing the owner to access the interior of the garage.

Many movable barrier operators, for example, garage door operators, use codes to activate the system where the codes change after each transmission. Such varying codes, called rolling access codes, are created by the transmitter and acted on by the receiver, both of which operate in accordance with the same method to predict a next rolling access code to be sent and received. One such rolling type access code includes four portions, a fixed transmitter identification portion, a rolling code portion, a fixed transmitter type identification portion, and a fixed switch identification portion. In this example, the fixed transmitter identification is a unique transmitter identification number. The rolling code portion is a number that changes every transmission to confirm that the transmission is not a recorded transmission. The fixed transmitter type identification is used to notify the movable barrier operator of the type and features of the transmitter. The switch identification is used to identify which switch on the transmitter is being pressed, because there are systems where the function performed is different depending on which switch is pressed.

When the movable barrier operator is installed, the homeowner typically receives at least one handheld transmitter that is already trained into the operator. To operate the door from a new learning transceiver, there is generally a two-step learning procedure for training the new learning transceiver. The first step is to teach the learning transceiver the type and potentially the code of the owner's handheld transmitter. While holding the handheld transmitter a few inches from the learning transceiver, the owner presses and holds the handheld transmitter's button at the same time as pressing a button on the learning transceiver to teach the access code type and frequency to the learning transceiver. The second step of the learning process is to train the learning transceiver to the operator. To do this, the learn button on the overhead operator has to be pressed, and within a given time period the learning transceiver should be activated.

In another prior approach, these two steps are combined into a single step or done simultaneously. In one example, a pre-trained transmitter transmits a code to both an operator and a learning transceiver, which both save the code. Next, within a predetermined amount of time, the button is pressed on the learning transceiver to transmit a second rolling access code, which is received by the operator and compared with the first rolling type access code saved in the operator. If a predetermined correlation exists between the first rolling type access code and the second rolling type access code, the operator stores the representation of the second rolling type access code from the learning transceiver. Requiring that a user physically possess a pre-trained transmitter to train a learning transceiver to a movable barrier operator according to this approach ensures that the user is authorized to access the garage.

While these approaches are generally sufficient to train a learning transceiver to operate with a movable barrier operator while prohibiting unauthorized access, they are often inconvenient because they require the user to use a third piece of equipment, the pre-trained transmitter, to train the learning transceiver. For example, a user may find it confusing to use a pre-trained transmitter in a vehicle that comes equipped with an integral learning transceiver in order to train the integral learning transceiver. In addition, if multiple users require access to the same garage interior space, it may be inconvenient to require each user to use a pre-trained transmitter to train a learning transceiver.

SUMMARY

Generally speaking, and pursuant to these various embodiments, example movable barrier system and transceiver apparatuses and methods allow for a transceiver, for instance a universal transceiver, to learn a credential from a movable barrier operator by establishing a bidirectional communication between the transceiver and the movable barrier operator, upon the occurrence of a predetermined event, without the use of a preprogrammed transmitter.

In one approach, a movable barrier operator transmits a first transmission signal to a learning transceiver, the signal including a first rolling access code with a fixed code portion and a rolling code portion and stores a representation of the first rolling access code. The learning transceiver receives the transmission signal and derives the fixed code portion and the rolling code portion and stores a representation of at least one of the fixed code portion and the rolling code portion. The learning transceiver generates a second rolling access code based on at least one of the fixed code portion and the rolling code portion of the first rolling access code. The learning transceiver next transmits a second transmission signal, including the second rolling access code, to the movable barrier operator. The movable barrier operator receives the second transmission signal and compares at least one of the rolling code portion and the fixed code portion of the second rolling access code with the stored representation of the first rolling access code to determine whether a correlation exists. If a predetermined correlation exists between the stored representation of the first rolling type access code and the at least one of the rolling code portion and the fixed code portion of the second rolling access code, the movable barrier operator stores the representation of the second rolling access code from the learning transceiver.

By one approach, the predetermined correlation is represented by a correlation between the rolling access codes, such as the fixed code portion or the rolling code portion. For example, the rolling code portion of the second rolling access code may be next in sequence to the rolling code portion of the first rolling access code saved in the movable barrier operator or at least have some relationship to the first rolling access code. In one example, the fixed code portion is a transmitter number identification portion; however, it also may be a transmitter type identification portion or another portion of the rolling access code.

In one approach to provide enhanced security, the movable barrier operator may wait to transmit a first transmission signal including the first rolling access code until after detecting the occurrence of a predetermined event. By one approach, the predetermined event includes an authorization event, and the movable barrier operator may wait until it receives an indication that the authorization event has occurred prior to transmitting the first rolling access code. In one example, the authorization event includes a proximity detector that detects whether an object is located within a predetermined distance of the proximity detector. In another example, the authorization event includes the actuation of a switch on a wall mounted, wired controller. In another example, the authorization event includes the movable barrier operator receiving a signal from a learning transceiver above a predetermined threshold level. In yet another example, the authorization event includes receiving a response signal to a beacon signal previously transmitted from the movable barrier operator, wherein the response signal has a signal strength measured above a predetermined threshold level by the movable barrier operator. In this regard, the security is enhanced by having the movable barrier operator wait to transmit the first rolling access code until it has received an indication that an authorization event, indicating that a user or learning transceiver is authorized to communicate with the movable barrier operator, prior to imitating a training sequence.

In another example, the predetermined event includes an initiation event, and the movable barrier operator may wait until it has received an indication that the initiation event has occurred prior to transmitting the first transmission signal. In one example, a wall mounted control, including a user actuable switch, may be provided in the garage with a wired line running to the movable barrier operator, and may send a signal over the wired line to the movable barrier operator indicating that the initiation event has occurred upon actuation of the switch. In another example, the learning transceiver may include a user actuable switch that sends a signal to the movable barrier operator that an initiation event has occurred upon actuation of the switch. In yet another example, the learning transceiver may be configured to detect the actuation of a component of a vehicle and send an initiation transmission signal to the movable barrier operator that an initiation event has occurred upon detecting the actuation of the component. In this approach, the movable barrier operator may wait until it has received an indication of the occurrence of the initiation event alone, or in addition to an authorization event, prior to transmitting the first transmission signal. In this regard, the movable barrier operator will not initiate the training sequence each time an authorization event is detected, but instead will wait until it has received an indication that an initiation has also occurred prior to transmitting the first transmission signal. This provides a user of the system with control over initiating the training sequence.

In another approach, the movable barrier operator may include a timer to determine the amount of time elapsed after receiving an indication that an authorization event has occurred. The movable barrier operator may determine whether the indication that the initiation event has occurred within a predetermined amount of time after receiving the indication that the authorization event has occurred. If the indication that the initiation event has occurred is received after the predetermined amount of time has elapsed, the movable barrier operator may not initiate the training sequence. If the indication that the initiation event has occurred is received prior to the predetermined amount of time elapsing, the movable barrier operator may initiate the training sequence. In this manner, the security of the system may be enhanced by requiring that the training sequence be initiated within a predetermined amount of time after the movable barrier operator determines that it is authorized to communicate with the learning transceiver so that an unauthorized user cannot later initiate the training of an unauthorized learning transceiver.

BRIEF DESCRIPTION OF THE DRAWINGS

The above needs are at least partially met through provision of the method and apparatus for training a movable barrier operator transceiver described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
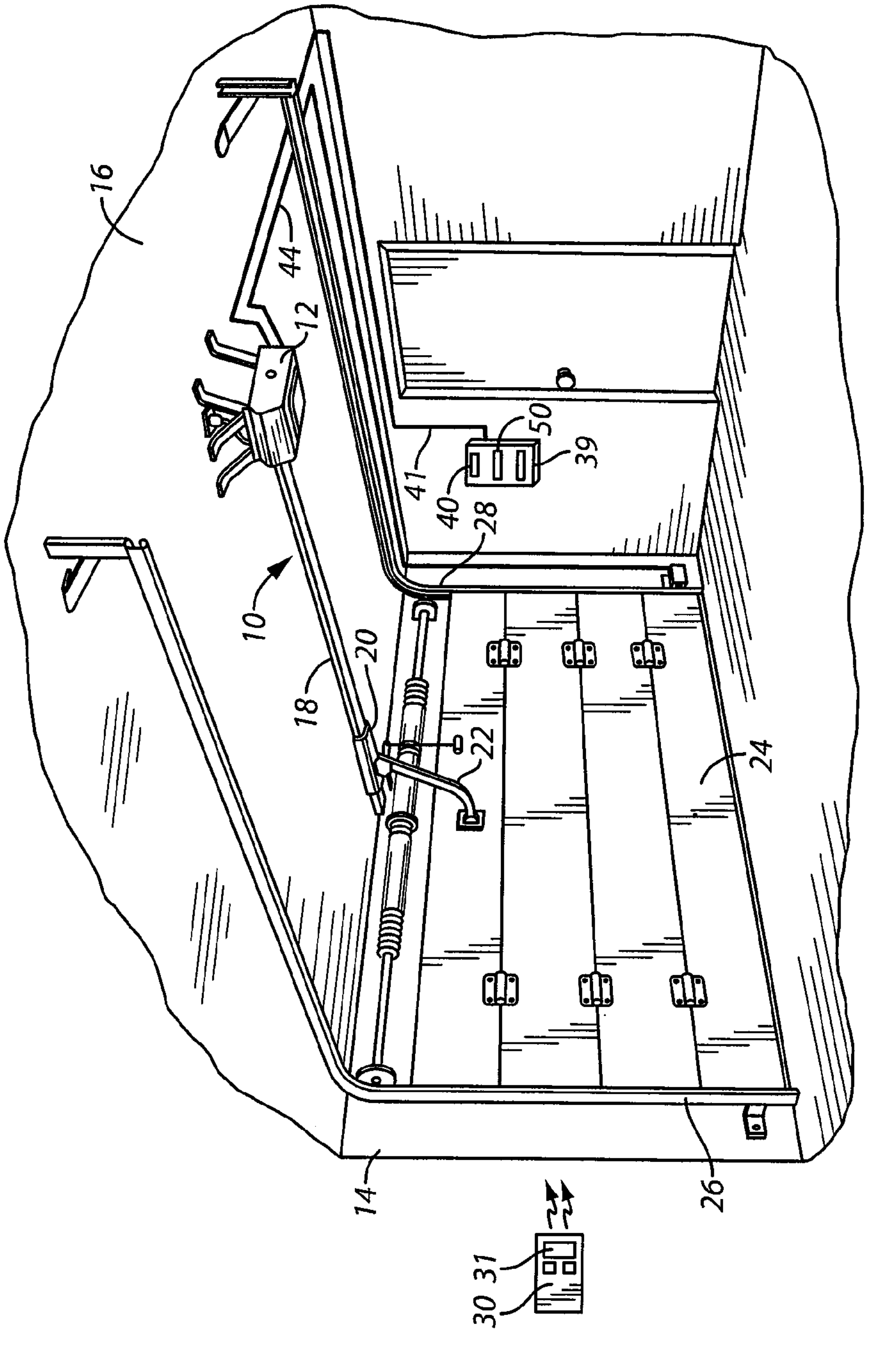
FIG. 1 comprises a perspective view of a movable barrier system as configured in accordance with various embodiments of the invention.
Figure 2:
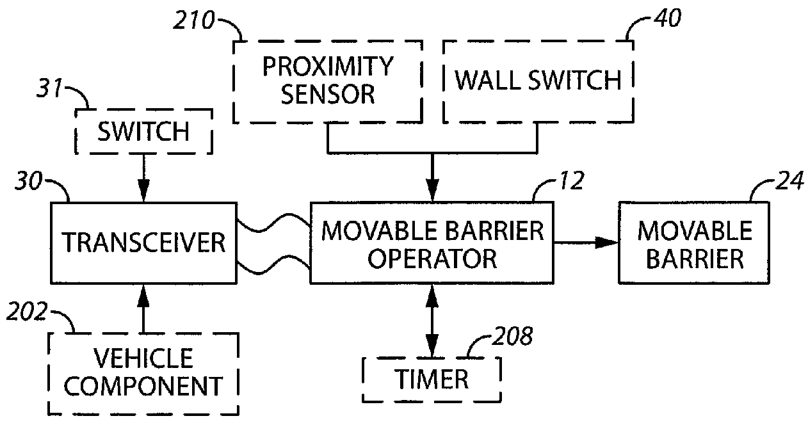
FIG. 2 comprises a block diagram of a movable barrier system as configured in accordance with various embodiments of the invention.

Referring now to the drawings, and in particular FIGS. 1 and 2, an example movable barrier system 10 includes a movable barrier operator 12, here a head unit, mounted within a garage 14 and employed for controlling the opening and closing of the movable barrier 24, in one example, a multiple paneled garage door 24. More specifically, the movable barrier operator 12 is mounted to the ceiling of the garage 14 and includes a rail 18 extending therefrom with a releasable trolley 20 attached having an arm 22 attached at one end to the garage door 24. The garage door 24 is positioned for movement along a pair of door rails 26 and 28. The movable barrier operator 12 includes a motor and an operator controller for controlling electrical power supplied to the motor. The operator controller for the movable barrier system 10 responds to various inputs by starting and stopping the motor, which is used to move the garage door 24. The movable barrier operator 12 transfers the garage door 24 between open and closed positions for allowing access to and from the garage 14.

An example system for implementing a training sequence of a learning transceiver 30 to operate with the movable barrier operator 12, according to one approach, will now be described. In this example, both the learning transceiver 30 and the movable barrier operator 12 are configured to communicate wirelessly by transmitting and receiving transmission signals, including rolling access codes, to and from one another. In order to initiate communication between the movable barrier operator 12 and the learning transceiver 30, the movable barrier operator 12 is configured to receive an authorization signal indicating that it is authorized to communicate with the learning transceiver 30. Upon receiving the authorization signal, the movable barrier operator 12 is further configured to transmit a transmission signal, including a rolling access code, to the learning transceiver 30 and to store a representation of the rolling access code. In this approach, the learning transceiver 30 is configured to receive the transmission signal, from the movable barrier operator 12, and to derive the rolling access code. The learning transceiver 30 is also configured to generate a new rolling access code based at least in part on the rolling access code, and to transmit a learning transceiver transmission signal to the movable barrier operator 12 including the new rolling access code. The movable barrier operator 12 is further configured to receive the learning transceiver transmission signal, to derive the new rolling access code therefrom, and to compare the new rolling access code with the stored representation of the original rolling access code to determine whether a correlation exists. If the movable barrier operator 12 determines that a correlation exists, the movable barrier operator 12 is configured to actuate the garage door 24 in response to receiving subsequent authorized transmission signals from the learning transceiver.

Figure 3:
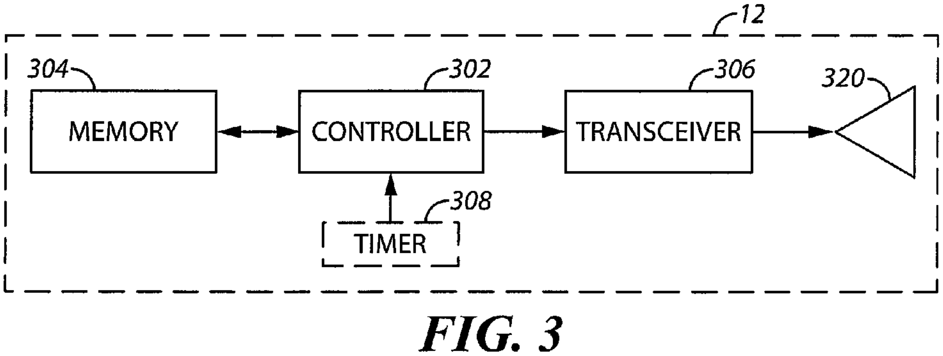
FIG. 3 comprises a block diagram of a movable barrier operator as configured in accordance with various embodiments of the invention.

Referring to FIG. 3, in one example, the movable barrier operator 12 includes a controller 302 in communication with a memory device 304 and is configured for storing and retrieving data to and from the memory device 304 as well as processing data and carrying out commands. The movable barrier operator 12 also includes a wireless transceiver 306 (or transmitter/receiver combination) in operative communication with the controller 302 and with one or more antennas 320 positioned in, on, or extending from the transceiver 30 and the movable barrier operator 12, wherein the wireless transceiver 306 is configured for transmitting and receiving data to and from the learning transceiver 30. In this regard, signals, such as radio frequency or other wireless transmission carriers, may be sent to and received from the learning transceiver 30 according to a variety of frequencies or modulations. Signals may be modulated in a number of different ways; thus, the transceiver 30 and movable barrier operator 12 may be configured to communicate with one another via a variety of signal modulations.

In this example, the transceiver 306 is configured to receive an authorization signal indicating that it is authorized to communicate with a learning transceiver 30 and to provide an indication that it received the authorization signal to the controller 302. In response to receiving the indication, the controller 302 is configured to generate a first rolling access code and to store a representation of the first rolling access code in the memory device 304. The controller 302 is configured with the transceiver 306 to transmit a transmission signal including the first rolling access code to the learning transceiver 30. The transceiver 306 is further configured for receiving a transmission signal from the learning transceiver 30 including a second rolling access code, as described further below. In this example, the transceiver 306 provides the transmission signal to the controller 302, which compares the second rolling access code with the representation of the first rolling access code stored in the memory device 304.

Figure 4:
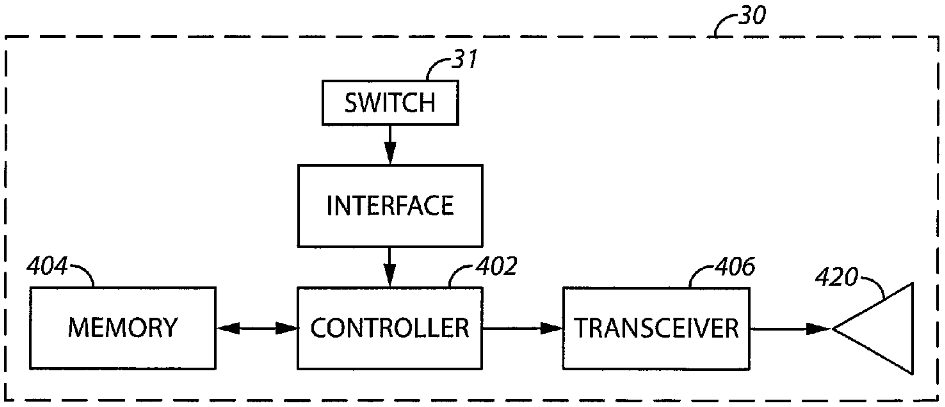
FIG. 4 comprises a block diagram of a learning transceiver as configured in accordance with various embodiments of the invention.

Turning now to an example learning transceiver 30 with reference to FIG. 4, the learning transceiver 30 also includes a transceiver 406 (or transmitter/receiver combination) in operative communication with one or more antennas 420 positioned in, on, or extending from the learning transceiver 30, wherein the transceiver 406 is configured for wirelessly transmitting and receiving transmission signals to and from the movable barrier operator 12, including transmission signals that contain a first rolling access code with a fixed code portion and a rolling code portion. The learning transceiver 30 also includes a controller 402 in operative communication with the transceiver 406 and a memory device 404 and is configured for processing data and carrying out commands. The controller 402 is configured to derive the first rolling access code, including at least one of the fixed code portion and the rolling code portion from the transmission signal and to generate a second rolling access code for transmission to the movable barrier operator 12 based, at least in part, on at least one of the fixed code portion or the rolling code portion. The memory device 404 is connected for operative communication with the controller 402, and is configured to store at least one of the fixed code portion or the rolling code portion to be available to the controller for generating the new rolling access code. The transceiver 30 may also comprise one or more user actuable switches 31 for inputting commands to the transceiver 30, for example, a move barrier action command or a learning command as explained in more detail below.

Those skilled in the art will recognize and understand that such a movable barrier operator 12 and/or a learning transceiver 30 may be comprised of a plurality of physically distinct elements as is suggested by the illustrations shown in FIGS. 3 and 4. It is also possible, however, to view these illustrations as comprising logical views, in which case one or more of these elements can be enabled and realized via a shared platform. It will also be understood that such a shared platform may comprise a wholly or at least partially programmable platform as are known in the art.

While the above examples describe a transmission signal as including a rolling access code with a fixed code portion and a rolling code portion, it should be understood that transmission signals including other code values are envisioned as being within the scope of the invention. Code values may be a value of a code that is sent as part of a transmission between the transceiver 30 and the movable barrier operator 12 such that when the movable barrier operator 12 receives the code value, the movable barrier operator 12 is triggered to move the movable barrier 24. With respect to code formats, for example, fixed code or rolling code formats with and without encryption as known in the art, codes may be sent in a number of other formats between communicating devices, in addition to a rolling access code format that includes both a fixed code portion and a rolling code portion.

Turning to more of the specifics of one example approach, the movable barrier operator 12 is configured for training the learning transceiver 30 to operate with the movable barrier operator 12. More specifically, the movable barrier operator 12 is configured to transmit a training transmission signal to the learning transceiver 30. In one example, the training transmission signal includes a rolling access code. In this example, the movable barrier operator 12, and more specifically, the controller 302 thereof, is configured to generate the rolling access code based upon a predetermined algorithm. The rolling access code includes a combination of a fixed code portion that remains constant and a variable or rolling code portion that changes after each transmission. More particularly, the rolling access code portion is incremented after sending a transmission signal and prior to sending a subsequent transmission signal. For example, after generating the rolling code portion, the controller 302 encrypts the rolling access code using a known programmed algorithm to restrict unauthorized third parties from intercepting the transmission signal and deriving the rolling access code to gain unauthorized access to the garage 14. The movable barrier operator 12 can transmit the training transmission signal, including the rolling access code, to the learning transceiver 30 via a transceiver 306. The movable barrier operator 12 may also store a representation of the transmitted rolling access code in the memory device 304 for later authenticating a responsive transmission signal received from the transceiver 30, as described below.

As mentioned previously, the transceiver 30 is configured for communicating wirelessly with the movable barrier operator 12 and includes a transceiver 406 to transmit and receive wireless signals to and from the movable barrier operator 12. In one approach, the learning transceiver 30 is a universal transceiver, which is adapted to send transmission signals to and receive transmission signals from a variety of commercially available movable barrier operators. In any event, upon receiving a transmission signal from the movable barrier operator 12, the learning transceiver 30, and more specifically, the controller 402 thereof, is adapted to derive the fixed code portion and the rolling code portion of the rolling access code from the transmission signal. If the rolling access code is encrypted, the controller 402 is further configured to extract the rolling access code from the encrypted transmission based on a programmed algorithm. The controller 402 may generate a new rolling access code based on one or both of the fixed code portion and the rolling code portion received from the movable barrier operator 12. The new rolling access code may be generated by incrementing the rolling code portion of the original rolling access code, using a counter or other known devices, and combining it with the fixed code portion. After generating the new rolling access code, the learning transceiver 30 generates a response transmission signal, including the new rolling access code, and transmits the response transmission signal from the transceiver 406. This transmission signal may also be encrypted for security purposes, as is known in the art, before being transmitted. The learning transceiver 30 may also store a representation of the new rolling access code in the memory device 404 to generate subsequent rolling access codes for generating and transmitting operative commands to the movable barrier operator 12.

Upon receiving the response transmission signal from the learning transceiver 30, the movable barrier operator 12, and more specifically, the controller 302 thereof, is configured to derive the rolling code portion and the fixed code portion from the new rolling access code. If the response transmission signal is encrypted, the controller 302 is also configured to extract the rolling access code from the encrypted response transmission signal. The controller 302 compares at least one of the fixed code portion and the rolling code portion of the new rolling access code with the previously stored representation of the original rolling access code, previously stored in the memory device 304 as mentioned previously, to determine if a predetermined correlation exists. In one example, the predetermined correlation is a correlation between the fixed code portion of the new rolling access code and a stored representation of the fixed code portion of the original rolling access code. In another example, the correlation may be between the rolling code portion of the new rolling access code and an expected value of the rolling code portion of the new rolling access code that is based on the stored representation of the rolling code portion of the original rolling access code. However, the controller 302 may also determine whether other correlations exist between the new rolling access code and the stored representation of the original rolling access code.

If the controller 302 determines that the predetermined correlation between the received new rolling access code and the stored representation of the original rolling access code exists, the controller 302 in this approach stores a representation of the new rolling access code in the memory device 304. In this regard, the learning transceiver 30 may be adapted to transmit subsequent commands to the movable barrier operator 12 by generating subsequent transmission signals based on the stored representation of the new rolling access code that is executed by the movable barrier operator 12, and the movable barrier operator 12 is adapted to receive and respond to command transmission signals received from the now authenticated learning transceiver 30.

According to one approach, prior to transmitting the original rolling access code to the learning transceiver 30, the movable barrier operator 12 waits until it has received an indication that a predetermined event has occurred. More particularly, in one approach, in order to provide enhanced security to the movable barrier system 10 to decrease the likelihood that an unauthorized third party will intercept a training transmission signal from the movable barrier operator 12 to command the movable barrier operator 12 and gain unauthorized access to the garage 14, the predetermined event includes an authorization event, and the movable barrier operator 12 waits until it has received an indication that the authorization event occurred prior to transmitting the training transmission signal to the learning transceiver 30. The authorization event may include an event that indicates that the learning transceiver 30 is authorized to operate within the movable barrier system 10. For example, the authorization event may include an event or events that indicate that a user or the learning transceiver 30 is located on a protected side or secured side of the movable barrier (for example, within the garage 14) so that the movable barrier operator 12 may assume that the user or learning transceiver 30 is authorized communicate with the movable barrier operator 12 to gain access to the garage 14.

By one example, the authorization event includes an indication received by the movable barrier operator 12 indicating that a switch on a wall mounted wired transmitter 39 has been actuated. According to this example, explained with reference to FIG. 1, a wired transmitter 39, which may include any number of user actuable switches as required for a given system, is mounted on the wall of the garage 14. The wired transmitter 39 communicates with the movable barrier operator 12 through a direct physical wired connection 41 to the movable barrier operator 12 using any known method of communication. The wired transmitter 39 includes a user actuable training switch 40. When the training switch 40 is actuated by a user, it provides a signal to the movable barrier operator 12, through the wired connection 41, indicating that the movable barrier operator 12 is authorized to communicate with the wireless learning transceiver 30. Because the wired transmitter 39 is located on the protected side of the movable barrier 24 (for example inside the garage 14), the movable barrier operator 12 assumes that the user actuating the training switch 40 is an authorized user. In this example, upon receiving the indication that the training switch 40 on the wired transmitter 30 has been actuated, the movable barrier operator 12 initiates the training sequence of the learning transceiver as described previously.

Figure 5:
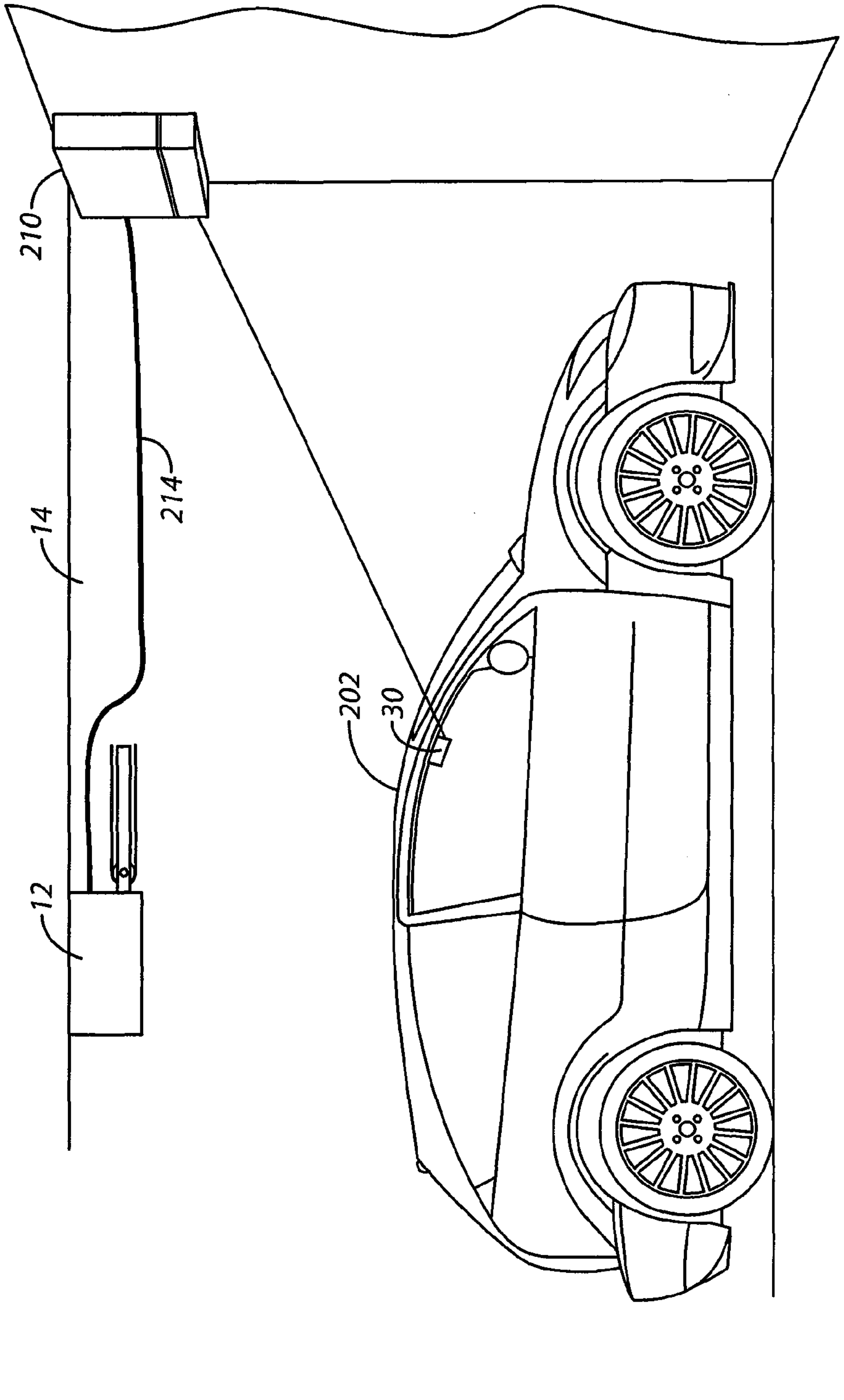
FIG. 5 comprises a perspective view of a movable barrier system as configured in accordance with various embodiments of the invention.

According to another approach and with reference to FIGS. 2 and 5, the movable barrier system 10 includes a proximity detector 210, configured to detect the presence of an object located within a predetermined distance from the proximity detector 210. In this example, the proximity detector 210 is mounted inside the garage 14 and configured to detect a motor vehicle 202, a learning transceiver 30, or other object that is located within the garage 14 although other known proximity detectors and configurations can be used. The proximity detector 210 of this example may be connected to the movable barrier operator 12 by a wired connection 214, and is configured to communicate with the movable barrier operator 12 by the wired connection 214 using any commonly known form of communication. In other approaches, the proximity detector 210 may communicate wirelessly with the movable barrier operator 12 or be integrated with the movable barrier operator 12. More particularly, upon detecting the object located within the predetermined distance from the proximity detector 210, the proximity detector 210 is configured to transmit an authorization signal to the movable barrier operator 12 that includes information indicating that the movable barrier operator 12 is authorized to communicate with the learning transceiver 30. Accordingly, upon receipt of the authorization signal, the movable barrier operator 12 may initiate the training sequence described previously.

According to yet another example, the movable barrier operator 12 is configured to transmit polling or beacon signals at regular intervals. The polling signals include a request for a learning transmitter 30 to provide a responsive transmission signal requesting training. Upon receiving a polling signal from the movable barrier operator 12, the learning transceiver 30 is configured to provide a responsive transmission signal that includes a request for training. The responsive transmission signal includes identification information that identifies that the learning transceiver 30 is of the type authorized to communicate with the movable barrier operator 12, and upon receiving the response transmission, the movable barrier operator 12 is configured to initiate the training sequence. Alternatively, the learning transceiver 30 includes a training request switch, for instance of the switches 31. Upon actuation of the training request switch, the learning transceiver 30 generates a training request transmission signal to the movable barrier operator 12. Upon receiving the training request transmission signal, the movable barrier operator 12 is configured to initiate the training sequence. According to one approach, for either of these examples, the movable barrier operator 12 includes a signal strength detection device, such as a known signal strength detection algorithm run by the controller 302 in communication with the transceiver 306 that determines the signal strength of the responsive transmission signal or training request transmission signal from the learning transceiver 30. The signal strength detection device measures the signal strength of the responsive transmission signal or the training request transmission signal, and the controller 302 determines whether the signal strength is above a predetermined threshold level, indicating that the learning transceiver 30 is within a predetermined authorized distance from the movable barrier operator 12 (for example, a distance correlating to the learning transceiver 30 being located inside the garage 14). Accordingly, if the movable barrier operator 12 receives a response transmission signal having a signal strength above the predetermined threshold level, the movable barrier operator 12 assumes that it received the signal from an authorized learning transceiver 30 and initiates the training sequence described previously. If the movable barrier operator 12 receives a signal with a signal strength that is measured as falling below the predetermined threshold level, the movable barrier operator 12 assumes that it received the signal from an unauthorized learning transceiver 30 and does not initiate the training sequence.

While the foregoing description provides several examples of methods and apparatuses for detecting and determining that a learning transceiver 30 is authorized to communicate with the movable barrier operator 12, other methods and apparatus are envisioned for determining that the movable barrier operator 12 is authorized to communicate with the learning transceiver 30.

In one approach, the movable barrier operator 12 receives an indication that a single predetermined event (i.e., an authorization event) has occurred prior to initiating the training sequence described above. In another approach, the movable barrier operator 12 requires that it receive an indication that an additional predetermined event has occurred, (i.e., a training sequence initiation event) prior to initiating the training sequence. For example, if a proximity detector 210, as described previously, is used with the movable barrier system 10 to provide an authorization signal to the movable barrier operator 12, it may be undesirable for the movable barrier operator 12 to initiate a training sequence every time the proximity detector 210 detects the presence of an object as described above. Instead, in this approach, the movable barrier operator 12 waits until it has received an indication that both an authorization event and an initiation event have occurred prior to initiating the training sequence.

In one example, the initiation event includes actuating an initiation switch 50 on the wall control 39 and the movable barrier operator 12 waits until it has received an indication that the initiation switch 50 has been actuated prior to initiating the training sequence. In this example, the movable barrier operator 12 also waits until it receives an indication that an authorization event, as described previously, occurred prior to initiating the training sequence. For example, if the initiation switch 50 on a wall control 39 is used in a system 10 including a proximity detector 210, the movable barrier operator 12 waits until it receives an indication that the proximity detector 210 detected the presence of an object within a predetermined distance of the proximity detector and until the operator 12 receives an indication that the initiation switch 50 is actuated prior to initiating the training sequence of the learning transceiver 30. The initiation switch 50 may also be used in combination with other apparatus or methods for providing the authorization event as described previously.

In another example, the initiation event includes the actuation of an initiation switch, such as one of the switches 31, on the learning transceiver 30, and the movable barrier operator 12 may wait until it has received an indication that the initiation switch has been actuated prior to initiating the training sequence. In this example, the learning transceiver 30 includes an initiation switch. The learning transceiver 30 is configured to generate and transmit a wireless initiation signal upon actuation of the initiation switch. The transceiver 306 of the movable barrier operator 12 is configured to receive the initiation signal from the learning transceiver 30 and provide an indication to the controller 302 that an initiation signal has been received. In this example, the movable barrier operator 12 waits until it receives both an indication that an initiation event occurred and an indication that an authorization event, as described previously, occurred prior to initiating a training sequence.

In still another example, the initiation event includes the actuation of a vehicle component. In this example, the learning transceiver 30 is configured for detecting the actuation of a vehicle component, and upon detecting the actuation of the vehicle component; the learning transceiver 30 generates and transmits an initiation transmission signal to the movable barrier operator 12. More particularly, in this example the learning transceiver 30 is configured to non-invasively detect the occurrence of an event involving an actuation of at least one component of a motor vehicle. For example, the learning transceiver 30 non-invasively detects the actuation of an automotive light, actuation of a brake, motion of a window, activation of a lock, movement of a mirror, movement of a radio control, movement of a moon roof or sun roof, movement of a windshield wiper blade, actuation of a heater, or the setting of a cruise control to name a few examples. Then the learning transceiver 30 transmits an initiation transmission signal to the movable barrier operator 12 as a result of detecting the event. The learning transceiver 30 detects the event using a sensor that detects energy produced as a result of the occurrence of the event, as described in commonly owned U.S. Pat. No. 7,477,147, which is incorporated by reference, in its entirety, herein. In this approach, the learning transceiver 30 may include a sensor that detects the energy produced as a result of the occurrence of the event with minimal interference and interaction with the components of the vehicle. Alternatively, the learning transceiver 30 may be formed integral with a motor vehicle and may be interconnected to one or more components of the vehicle such that upon actuation of the vehicle component, a signal is sent to the learning transceiver 30 via a wired connection. Upon receiving a signal that the vehicle component was actuated, the learning transceiver 30 generates and transmits an initiation transmission signal to the movable barrier operator 12 including an indication that the initiation event occurred. In this example, the movable barrier operator 12 waits until it receives both the indication that the initiation event and the indication that the authorization event, as described previously, occurred prior to initiating the training sequence.

In one approach, if the movable barrier operator 12 waits to receive an indication that both an authorization event and an initiation event have occurred prior to initiating a training sequence of the learning transceiver 30 as described previously, the movable barrier operator 12 may include a timer 308 (FIG. 4) that measures the amount of time that has elapsed after it has received an indication that the authorization event has occurred. In this approach, the movable barrier operator 12, and more specifically the controller 302 thereof, is configured to determine whether a predetermined amount of time has elapsed after receiving an indication that the authorization event occurred during which time the movable barrier operator 12 listens for receipt of an indication that an initiation event occurred. If the predetermined amount of time does not pass before the movable barrier operator 12 receives the initiation event, the movable barrier operator 12 initiates the training sequence. If the predetermined amount of time does pass prior to receiving the indication that the initiation event occurred, the movable barrier operator 12 will not initiate the training sequence. In this manner, if the initiation event does not occur within the predetermined amount of time, the movable barrier operator 12 will not initiate the training sequence to train the learning transceiver 30 and will instead reset itself and wait for a subsequent indication that an authorization event has occurred.

Figure 6:
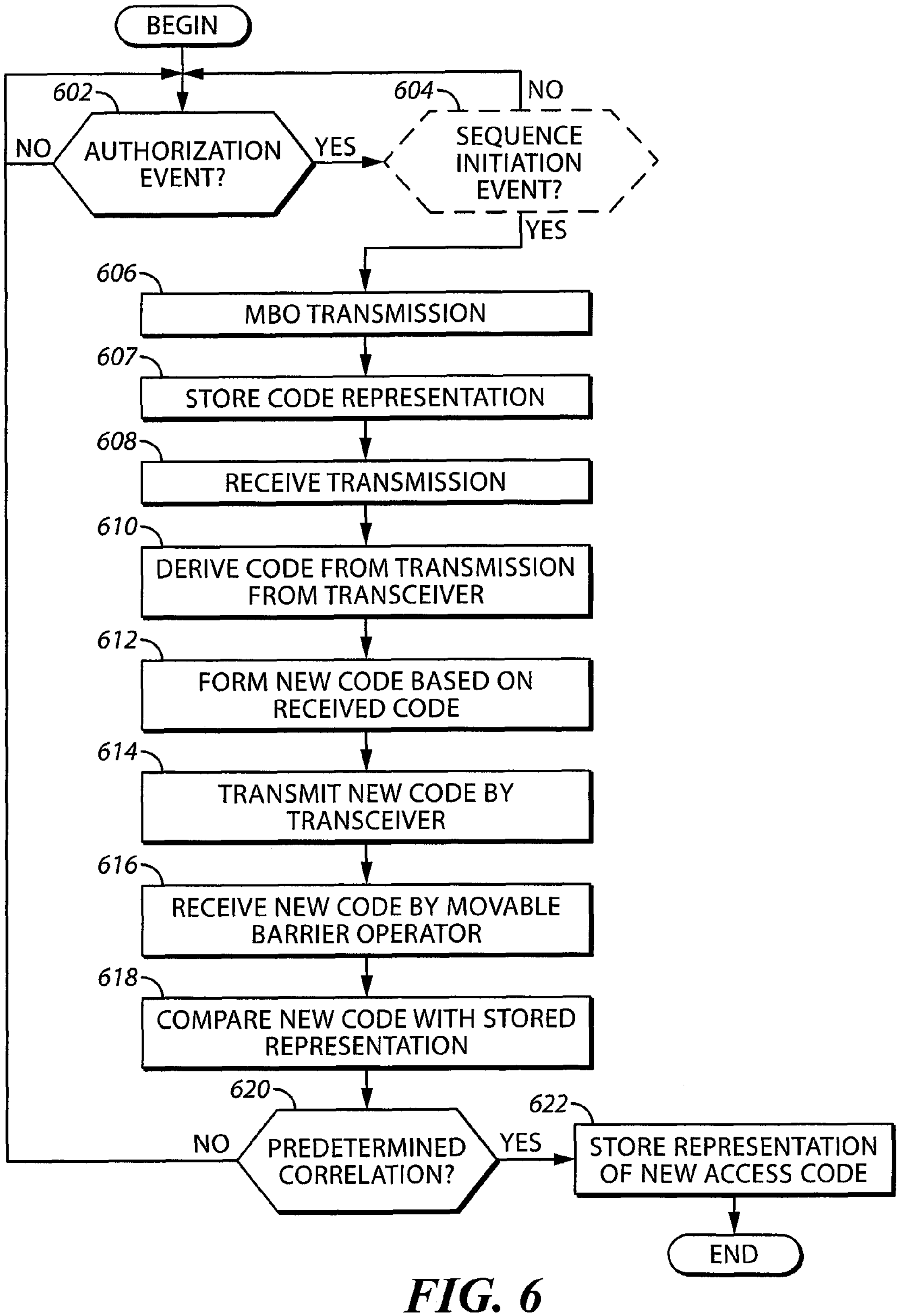
FIG. 6 comprises a flow diagram of an example method of operation of a movable barrier system as configured in accordance with various embodiments of the invention.

An example method of operating the movable barrier system 10 for training a learning transceiver 30 will now be described with reference to FIG. 6. The method includes the step 602 of determining whether an authorization event has occurred. In one approach, the method optionally includes at step 604 receiving an indication that initiation event has occurred. At step 606, in response to determining that an authorization event occurred and, optionally, that an initiation event occurred within a predetermined time period of the authorization event, the method includes the movable barrier operator transmitting a training transmission signal to the learning transceiver including a rolling access code. At step 607, the movable barrier operator stores a representation of the rolling access code. At step 608, the learning transceiver receives the training transmission signal and at step 610, derives at least one of a rolling code portion and a fixed code portion from the received training transmission signal. The method also includes, at step 612, the learning transceiver generating a new rolling access code based on at least one of the rolling code portion and the fixed code portion and, at step 614, sending a response transmission signal to the movable barrier operator including the new rolling access code. At step 616 the method includes the movable barrier operator receiving the second transmission signal including the new rolling access code. After receiving the second transmission signal, at step 618, the movable barrier operator compares the new rolling access code with the stored representation of the first rolling access code and, at step 620, determines whether a predetermined correlation exists. If the predetermined correlation exists, the method includes at step 622, the movable barrier operator storing a representation of the new rolling access code. If the predetermined correlation does not exist or if no authorization event or, optionally no initiation event, occurs, the method may reset and start over.

Figure 7:
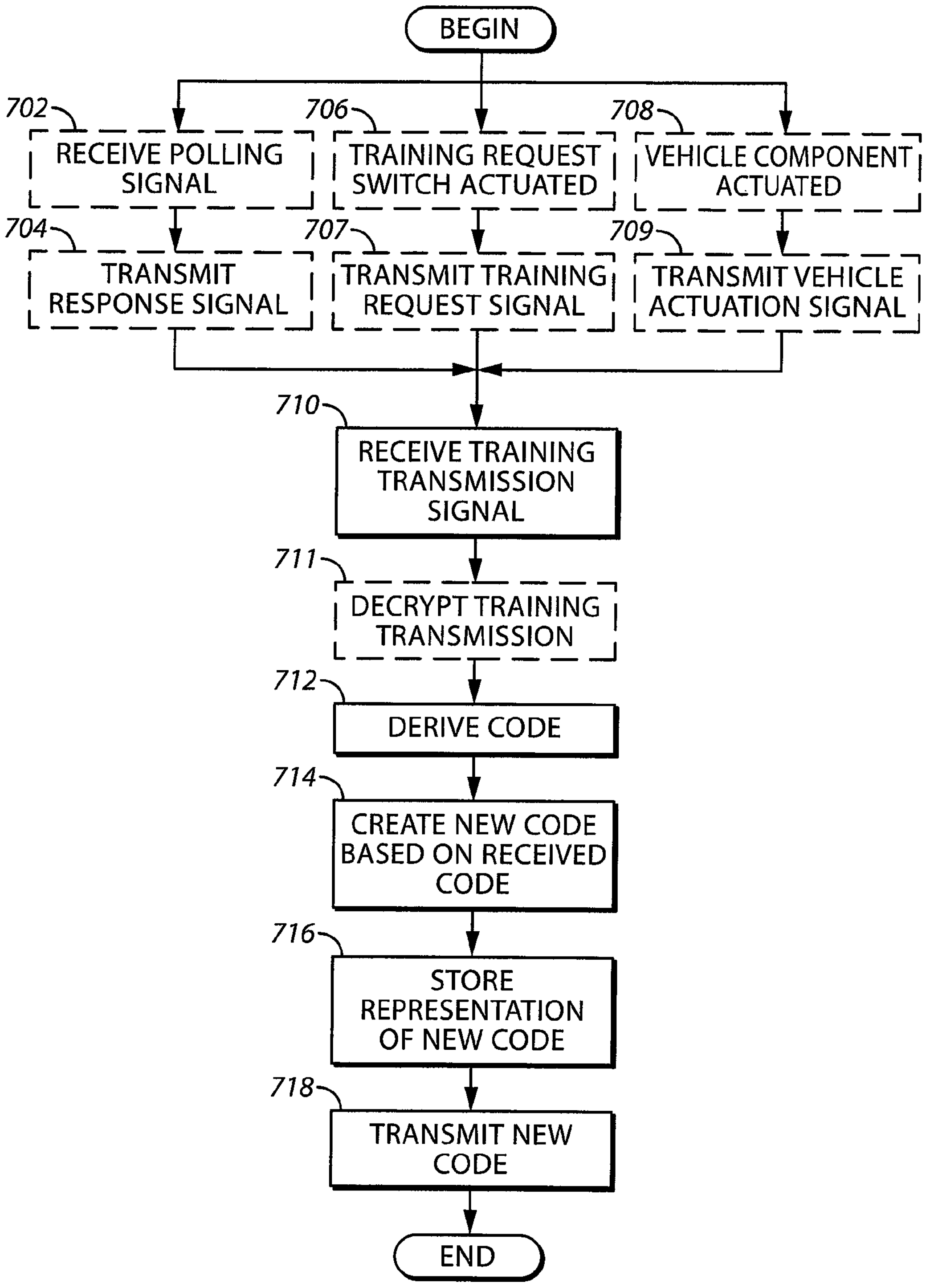
FIG. 7 comprises a flow diagram of an example method of operation of a movable barrier operator as configured in accordance with various embodiments of the invention.

Turning now to FIG. 7, an example of the operation of a learning transceiver 30 is described. In one approach, the method includes at step 702 receiving a polling signal from the movable barrier operator. In this approach, the learning transceiver receives a polling signal from a movable barrier operator with a request for a response signal and transmits a response transmission signal in response. After receiving a polling signal, the method includes at step 704, transmitting a response transmission signal. In another approach, the method includes receiving an indication that a user actuable switch on the learning transceiver has been actuated at step 706. Then at step 707, the method includes transmitting a transmission signal to the movable barrier operator. In yet another optional approach, the method includes, at step 708, receiving an indication that a component of a vehicle has been actuated. According to this approach, upon receiving an indication that a component of the vehicle has been actuated, the method includes at step 709 transmitting an initiation signal to the movable barrier operator including information indicating that a training sequence should be initiated.

The method of FIG. 7 includes at step 710 receiving a training transmission signal from the movable barrier operator including a rolling access code. The method also includes, at step 711, decrypting the transmission signal to extract the rolling access code if the received data transmission is encrypted. At step 712, the learning transmitter derives at least one of a fixed code portion and a rolling code portion. After deriving the fixed code portion and the rolling code portion, the learning transceiver, at step 714, creates a new rolling access code based on the received rolling access code. The method also includes storing a representation of the new rolling access code at step 716. At step 718, the learning transmitter transmits a transmission signal including the new rolling access code to the movable barrier operator.

Figure 8:
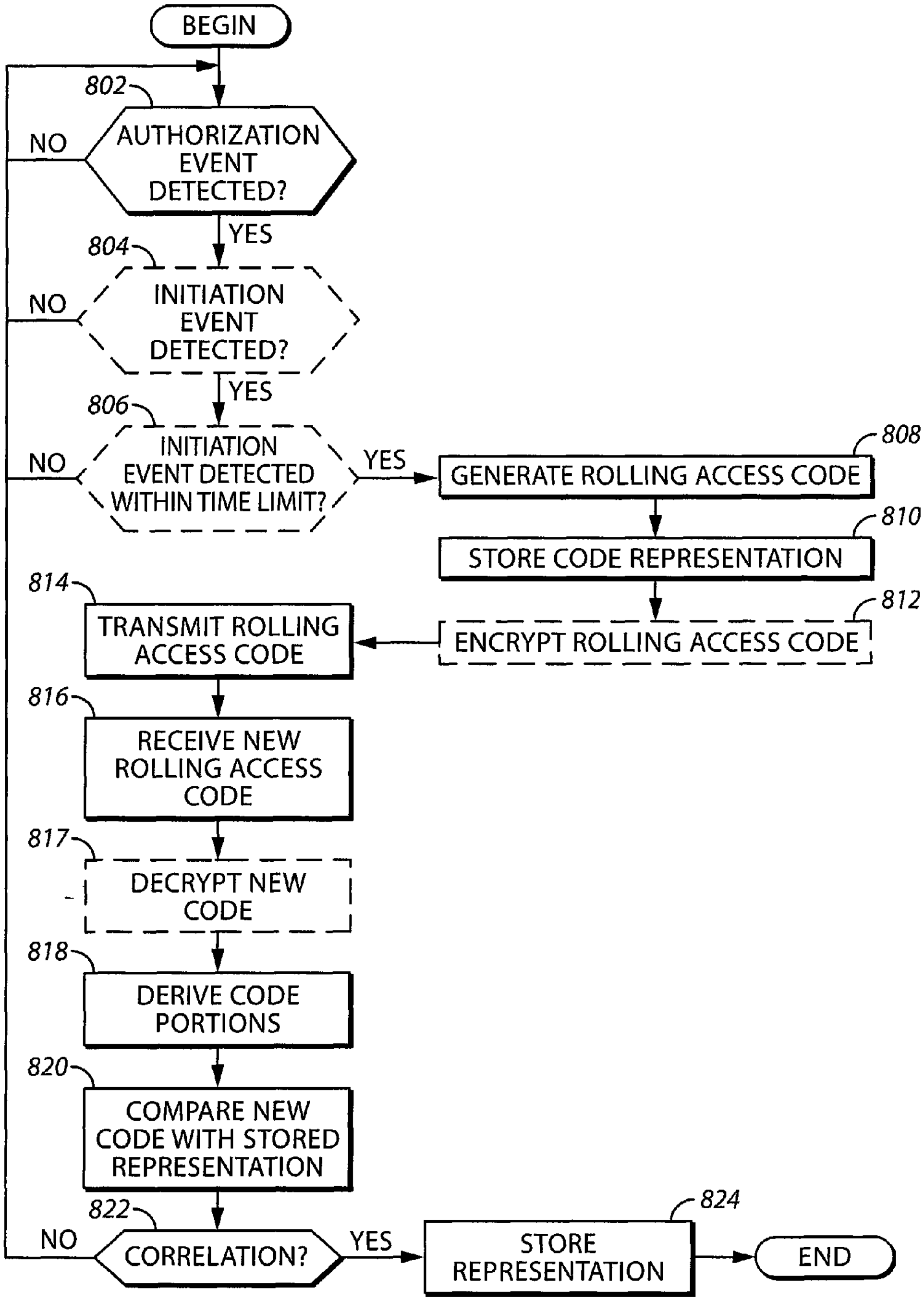
FIG. 8 comprises a flow diagram of an example method of a learning transceiver as configured in accordance with various embodiments of the invention.

Referring next to FIG. 8, an example of operation of a movable barrier operator 12 in accordance with these teachings is described. At step 802, the method includes receiving information about the occurrence of an authorization event. The authorization event may include any type of event that indicates that the learning transceiver is authorized to be trained. In one example, the indication that an authorization event occurred includes receiving a signal indicating the detection of an object by a proximity detector located within a predetermined distance from the proximity detector. In another example, the indication that an authorization event occurred includes receiving a response to a beacon signal having a signal strength above a predetermined threshold level indicating that the learning transceiver is located within a predetermined distance from the movable barrier operator. In another example, the indication includes receiving an indication that a training request transmission signal received from a learning transceiver includes a signal strength above a predetermined threshold level. In yet another example, the indication that an authorization event occurred includes receiving a signal that a switch on a wall mounted control was actuated, indicating that an authorized user has actuated the switch.

In another approach, determining whether a predetermined event occurred also includes at step 804, determining whether an initiation event occurred. In one example, determining whether an initiation event occurred includes determining whether an indication that a switch on a wall mounted control has been actuated has been received. In another example, determining whether an initiation event has occurred includes determining whether an indication that a switch on the learning transceiver has been actuated has been received. In still another example, determining the initiation event occurred includes determining whether an indication was received that a predetermined component of a motor vehicle was actuated. In another approach, the method further includes, at step 806, determining whether an initiation event occurred within a predetermined amount of time after receiving an indication that the authorization event has occurred.

The method of operation also includes, at steps 808 and 810, generating a transmission signal including a first rolling access code and storing the code representation. In one approach, at step 812, the method includes encrypting the rolling access code. If the movable barrier operator determined that a predetermined event occurred, the method includes, at step 814, transmitting a transmission signal, including a first rolling access code, to the learning transceiver. The method also includes, at step 816, receiving a second transmission signal, including a second rolling access code, from a learning transceiver. In one approach, if the second rolling access code is encrypted, the method includes, at step 817, decrypting the transmission signal to extract the second rolling access code. At step 818, the movable barrier operator derives at least one of the rolling code portion and the fixed code portion from the second rolling access code and, at step 820, compares the at least one of the rolling code portion and the fixed code portion to the stored representation of the first rolling access code. At step 822, the method includes determining whether a predetermined correlation exists between at least one of the fixed code portion and rolling code portion of the second rolling access code, and the stored representation of the first rolling access code. If the predetermined correlation does not exist, by one approach, the method resets and starts again. If the correlation does exist, the method includes at step 824, storing a representation of the second rolling access code for authenticating subsequent transmissions received from the learning transmitter.

So configured, the movable barrier system and method provide the ability for a user to conveniently train a learning transceiver to the movable barrier system, without the need for a separate pretrained transmitter. Such a configuration reduces the complexity for users to perform a training sequence, while maintaining security of the movable barrier system by restricting unauthorized access.

Those skilled in the art will recognize that a wide variety of modification, alterations, and combinations can be made with respect to the above described embodiments without departing from the scope of the invention, and that such modifications, alterations, and combinations are to be viewed as being within the ambit of the inventive concept.

What is claimed is:

1. A method for training a learning transceiver to operate with a movable barrier system, the method comprising:

receiving a transmission signal by the learning transceiver from a movable barrier operator, the transmission signal transmitted in response to the movable barrier operator receiving a signal indicating an occurrence of a predetermined event, wherein the transmission signal comprises a fixed code portion and a rolling code portion;

deriving from the transmission signal the fixed code portion and the rolling code portion by the learning transceiver;

using at least one of the fixed code portion and the rolling code portion to generate a new rolling access code by the learning transceiver; and transmitting the new rolling access code to the movable barrier operator by the learning transceiver.

2. The method of claim 1, further comprising the learning transceiver transmitting an authorization signal to the movable barrier operator, in response to the occurrence of the predetermined event, prior to the movable barrier operator transmitting the transmission signal to the learning transceiver, wherein the authorization signal informs the movable barrier operator that it is authorized to communicate with the learning transceiver.

3. The method of claim 2, wherein the predetermined event comprises receiving a polling signal by the learning transceiver from the movable barrier operator.

4. The method of claim 2, wherein the predetermined event comprises receiving a signal by the learning transceiver indicating actuation of a switch in the learning transceiver.

5. The method of claim 2, wherein the predetermined event comprises receiving a signal by the learning transceiver indicating actuation of one or more components of a motor vehicle.

6. The method of claim 1, wherein the predetermined event comprises the movable barrier operator receiving a signal indicating that a proximity detector detected a presence of a motor vehicle located within a predetermined distance from the proximity detector.

7. The method of claim 1, further comprising the learning transceiver transmitting an initiation signal to the movable barrier operator in response to the occurrence of a predetermined event, wherein the initiation signal informs the movable barrier operator that it is authorized to initiate a training sequence of the learning transceiver if the movable barrier operator has previously received an authorization signal.

8. The method of claim 7, wherein the predetermined event comprises receiving a signal by the learning transceiver indicating actuation of a switch in the learning transceiver.

9. The method of claim 7, wherein the predetermined event comprises receiving a signal by the learning transceiver indicating actuation of one or more components of a motor vehicle.

10. The method of claim 1, wherein transmitting the new rolling access code comprises transmitting a signal comprising the fixed code portion and the rolling code portion.

11. A learning transceiver configured to be trained to operate with a movable barrier system, the learning transceiver comprising:

a transceiver configured to receive from a movable barrier operator a transmission signal transmitted in response to the movable barrier operator receiving a signal indicating an occurrence of a predetermined event, the transmission signal comprising a first rolling access code comprising a fixed code portion and a rolling code portion, the transceiver further configured to transmit a new transmission signal comprising a second rolling access code to the movable barrier operator;

a controller connected for operative communication with the transceiver, the controller configured to derive the fixed code portion and the rolling code portion from the transmission signal and to generate the second rolling access code for transmission to the movable barrier operator based, at least in part, on at least one of the fixed code portion or the rolling code portion; and a memory device connected for operative communication with the controller, the memory device configured to store at least one of the fixed code portion or the rolling code portion to be available to the controller for generating the second rolling access code.

12. The learning transceiver of claim 11, wherein the signal indicating an occurrence of a predetermined event comprises an authorization signal configured to verify that the learning transceiver is authorized to communicate with the movable barrier operator, wherein the authorization signal is sent to the movable barrier operator in response to occurrence of a predetermined event.

13. The learning transceiver of claim 12, wherein the learning transceiver is configured to transmit the authorization signal to the movable barrier operator and wherein the predetermined event comprises the learning transceiver receiving a signal indicating actuation of a switch in the learning transceiver.

14. The learning transceiver of claim 12, wherein the learning transceiver is configured to transmit the authorization signal to the movable barrier operator and wherein the predetermined event comprises the learning transceiver receiving a signal indicating actuation of a component of a motor vehicle.

15. The learning transceiver of claim 12, wherein the learning transceiver is configured to transmit the authorization signal to the movable barrier operator and wherein the predetermined event comprises the learning transceiver receiving a polling signal from the movable barrier operator.

16. The learning transceiver of claim 12, wherein the predetermined event comprises a proximity sensor detecting a motor vehicle being located within a predetermined distance from the proximity sensor.

17. The learning transceiver of claim 12, wherein the predetermined event comprises actuation of a user-actuable switch on a protected side of the movable barrier.

18. The learning transceiver of claim 12, wherein the transmission signal is sent to the learning transceiver by the movable barrier operator in response to the movable barrier operator receiving an initiation signal and the authorization signal, the initiation signal configured to indicate initiation of a training sequence of the learning transceiver.

19. The learning transceiver of claim 18, wherein the learning transceiver is configured to transmit the initiation signal in response to receiving a signal indicating actuation of a switch in the learning transceiver.

20. The learning transceiver of claim 18, wherein the learning transceiver is configured to transmit the initiation signal to the movable barrier operator in response to the learning transceiver receiving a signal indicating actuation of a component of a motor vehicle.

21. A movable barrier operator system for training a learning transceiver, the movable barrier operator system comprising:

a movable barrier operator, the movable barrier operator comprising:

a transceiver configured to receive an authorization signal indicating that the movable barrier operator is authorized to communicate with a learning transceiver and in response to receiving the authorization signal, to transmit a transmission signal including a first rolling access code to the learning transceiver;

a controller connected for operative communication with the transceiver, the controller configured to generate the first rolling access code; and a memory device connected for operative communication with the controller, the memory device configured to store a representation of the first rolling access code to be available to the controller, wherein the transceiver is further configured to receive a transmission signal from the learning transceiver including a second rolling access code based, at least in part, on the first rolling access code, and wherein the controller is configured to compare the second rolling access code with the stored representation of the first rolling access code to determine whether a correlation exists.

22. The movable barrier operator system of claim 21, wherein the authorization signal comprises a signal indicating occurrence of a predetermined event.

23. The movable barrier operator system of claim 21, wherein the authorization signal comprises a signal indicating the actuation of a switch on the learning transceiver.

24. The movable barrier operator system of claim 21, wherein the authorization signal comprises a signal indicating the actuation of a component of a motor vehicle.

25. The movable barrier operator system of claim 21, wherein the transceiver is configured to transmit a polling signal and wherein the authorization signal comprises a signal indicating receipt of the polling signal by the learning transceiver.

26. The movable barrier operator system of claim 21, further comprising a proximity detector configured to detect a vehicle located within a predetermined distance from the proximity detector and to send a signal comprising the authorization signal in response to detecting the vehicle.

27. The movable barrier operator system of claim 21, wherein the transceiver is further configured to receive an initiation signal indicating initiation of a training sequence of the learning transceiver, and wherein the movable barrier operator is configured to wait to transmit the transmission signal to the learning transceiver until it has received both the authorization signal and the initiation signal.

28. The movable barrier operator system of claim 27, wherein the movable barrier operator is configured to transmit the transmission signal to the learning transceiver in response to receiving the initiation signal within a predetermined time of receipt of the authorization signal.

29. The movable barrier operator system of claim 28, wherein the initiation signal comprises a signal indicating actuation of a switch on the learning transceiver.

30. The movable barrier operator system of claim 28, wherein the initiation signal comprises a signal indicating actuation of a component of a motor vehicle.

31. The movable barrier operator system of claim 28, wherein the initiation signal comprises a signal indicating actuation of a wall mounted wired transmitter located on a protected side of a movable barrier.

32. A system for training a learning transceiver to a movable barrier system, the system comprising:

a learning transceiver;

a movable barrier operator configured to receive an authorization signal indicating that the movable barrier operator is authorized to communicate with the learning transceiver and in response to receiving the authorization signal, the movable barrier operator is configured to transmit a transmission signal including a rolling access code;

wherein the movable barrier operator stores a representation of the rolling access code to recognize a new rolling access code generated by the learning transceiver;

wherein the learning transceiver is configured to receive the transmission signal and derive from the transmission signal a fixed code portion and a rolling code portion, wherein the learning transceiver generates a new rolling access code based at least in part on the transmission signal and transmits a learning transceiver signal to the movable barrier operator including the new rolling access code; and wherein the movable barrier operator is configured to receive the learning transceiver transmission signal, derive the new rolling access code therefrom and compare the new rolling access code with the stored representation of the rolling access code to determine whether a correlation exists, and wherein if a correlation exists, the movable barrier operator is configured to actuate the movable barrier in response to receipt of transmissions from the learning transceiver.

33. The system for training a learning transceiver of claim 32, further comprising a proximity sensor configured to detect a vehicle located within a predetermined distance from the proximity sensor and to transmit a signal comprising the authorization signal in response to detecting the vehicle.

34. The system for training a learning transceiver of claim 32, further comprising a wall mounted wired transmitter in communication with the movable barrier operator configured to transmit a signal to the movable barrier operator comprising the authorization signal in response to receiving an indication that an authorization switch on the wall mounted wired transmitter has been actuated.

35. The system for training a learning transceiver of claim 32, wherein the authorization signal comprises a signal indicating the actuation of a switch on the learning transceiver.

36. The system for training a learning transceiver of claim 32, wherein the authorization signal comprises a signal indicating the actuation of a component of a motor vehicle.

37. The system for training a learning transceiver of claim 32, wherein the movable barrier operator is configured to transmit a polling signal and wherein the authorization signal comprises a response signal indicating receipt of the polling signal by the learning transceiver.

38. The system for training a learning transceiver of claim 37, wherein the movable barrier operator further comprises a signal strength detector, wherein the signal strength detector is configured to measure a strength of the response signal received by the movable barrier operator, wherein the movable barrier operator is configured to determine whether the strength of the response signal exceeds a predetermined threshold, and wherein the movable barrier operator is configured to transmit the transmission signal in response to determining that the strength of the response signal exceeds the predetermined threshold.

39. The system for training a learning transceiver of claim 32, wherein the movable barrier operator is further configured to receive an initiation signal indicating that initiation of a training sequence of the learning transceiver and wherein the movable barrier operator is configured to transmit the transmission signal in response to receiving both an authorization signal and an initiation signal.

40. The system for training a learning transceiver of claim 39, wherein the movable barrier operator further comprises a timer configured to determine an amount of time that passes between receipt of the authorization signal and receipt of the initiation signal, wherein the movable barrier operator is configured to determine whether the initiation signal is received within a predetermined amount of time relative to receipt of the authorization signal, and wherein the movable barrier operator is configured to transmit the transmission signal in response to determining that the initiation signal is received within the predetermined amount of time.

41. The system for training a learning transceiver of claim 38, further comprising a wall mounted wired transmitter in communication with the movable barrier operator, wherein the wall mounted wired transmitter is configured to transmit a signal to the movable barrier operator comprising the initiation signal in response to receiving an indication that an initiation switch on the wall mounted wired transmitter has been actuated.

42. The system for training a learning transceiver of claim 38, wherein the initiation signal comprises a signal indicating actuation of a switch on the learning transceiver.

43. The system for training a learning transceiver of claim 38, wherein the initiation signal comprises a signal indicating actuation of a component of a motor vehicle.

* * * * *